United States Patent [19]

Inagaki et al.

[11] 4,104,232
[45] Aug. 1, 1978

[54] HALOGEN-CONTAINING RESIN COMPOSITION

[75] Inventors: Takeo Inagaki, Yachiyo; Hideki Nakagawa, Tokyo; Hiroshi Isa, Yachiyo, all of Japan

[73] Assignee: Lion, Fat & Oil Company, Ltd., Tokyo, Japan

[21] Appl. No.: 704,657

[22] Filed: Jul. 12, 1976

[30] Foreign Application Priority Data

Jul. 18, 1975 [JP] Japan ................................. 50-87954

[51] Int. Cl.$^2$ ................................................ C08K 5/10
[52] U.S. Cl. ................................................ 260/31.6
[58] Field of Search ........................ 260/28.5 D, 31.6

[56] References Cited

U.S. PATENT DOCUMENTS

| | | | |
|---|---|---|---|
| 2,624,716 | 1/1953 | Smith | 260/31.6 |
| 3,423,347 | 1/1969 | Zawadzki | 260/31.6 |
| 3,578,621 | 5/1971 | Stapfer | 260/31.6 |
| 3,738,956 | 6/1973 | Glatti | 260/31.6 |
| 3,753,937 | 8/1973 | Stivers | 260/28.5 D |
| 3,864,295 | 2/1975 | Boussely | 260/31.6 |

*Primary Examiner*—Paul R. Michl
*Attorney, Agent, or Firm*—Bacon & Thomas

[57] ABSTRACT

A halogen-containing resin composition comprising a halogen-containing resin having incorporated therein one or more esters derived from one or more fatty acids and one or more polyhydric alcohols containing from 2 to 6 carbon atoms, said fatty acids being expressed by the general formula

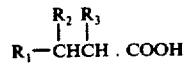

where at least two of the $R_1$, $R_2$ and $R_3$ radicals are alkyl radicals and, when two of them are alkyl radicals, the remaining one is hydrogen; and the total number of carbon atoms contained in the $R_1$, $R_2$ and $R_3$ radicals is in the range of from 18 to 38. The foregoing composition is excellent in lubricity and heat stability, thus causing no occurrence of "plate-out" or "blooming."

6 Claims, No Drawings

HALOGEN-CONTAINING RESIN COMPOSITION

This invention relates to lubricants for use in halogen-containing resins and also to halogen-containing resin compositions containing such lubricants.

Conventionally, it is well-known that halogen-containing resins require the addition of a heat stabilizer and a lubricant prior to molding, because they are subject to heat deterioration during processing due to their inherently low heat stability and poor lubricity for molding.

In halogen-containing resin compounds such as vinyl chloride resin compounds, therefore, salts of organic acids, metallic salts of organic acids, organotin compounds, and the like have heretofore been employed predominantly as heat stabilizers.

Among them, lead salts and lead soaps have been generally used owing to their superior heat-stabilizing effect and low prices.

Cadmium soaps have also been widely used with favor because they not only have good compatibility with resin compounds and satisfactory lubricating effect, but can produce such outstanding results that the resin compounds containing these soaps are excellent in processability and the products made of these resin compounds have high transparency.

However, these heat stabilizers containing lead or cadmium are detrimental to human beings and living organisms, which imposes limitation on their use.

As non-toxic heat stabilizers, there are calcium-zinc type heat stabilizers and tin type heat stabilizers such as di-n-octyltin compounds. But, they are poor in lubricating and/or heat-stabilizing properties, so that a variety of problems are encountered during processing.

Under these circumstances, it is desired to develop such excellent lubricants as can overcome the disadvantages of the conventional heat stabilizers. In fact, several attempts have already been made to achieve this purpose.

For example, modified montan wax, rice wax, low-molecular-weight polyethylene, and partially oxidized low-molecular-weight polyethylene have been tried for use as lubricants. However, they involve many problems to be solved with respect to lubricity, heat stability, and the balance between internal lubricity (lubricity among the molecules included in the resin compound) and external lubricity (lubiricity between the resin compound and the hot metallic surfaces of the molding equipment such as roller mill), thus failing to bring about satisfactory results.

It is an object of this invention to provide a halogen-containing resin composition having excellent lubricity and superior heat stability.

It is another object of this invention to provide a halogen-containing resin composition which is excellent in both internal and external lubricities as well as in the balance between these lubricities.

It is still another object of this invention to provide a halogen-containing resin composition which will not cause any occurrence of "plate-out" (the phenomenon in which some ingredients of the resin compound, such as lubricant, stabilizer, and the like, separate out during molding and deposit on the surfaces of the molding equipment such as roller mill).

It is still another object of this invention to provide a halogen-containing resin composition which will not cause any occurrence of "blooming" the phenomenon in which some ingredients of the resin compound, such as lubricant, stabilizer, and the like, separate out after molding and exude to the surface of the product.

It is still another object of this invention to provide a halogen-containing resin composition which will show only a low degree of discoloration during heating.

It is still another object of this invention to provide a halogen-containing resin composition having high transparency and good impact resistance.

It is still another object of this invention to provide a lubricant for use in halogen-containing resins which lubricant can allow the resulting halogen-containing resin compositions to have many characteristics as described above.

It is still another object of this invention to provide a lubricant for use in halogen-containing resins which lubricant can be employed in combination with a non-toxic heat stabilizer.

We have now discovered that the esters obtained by the esterification reaction of one or more fatty acids with one or more polyhydric alcohols containing from 2 to 6 carbon atoms are very excellent lubricants for use in halogen-containing resins, the fatty acids being expressed by the general formula

where at least two of the $R_1$, $R_2$ and $R_3$ radicals are alkyl radicals and, when two of them are alkyl radicals, the remaining one is hydrogen; and the total number of carbon atoms contained in the $R_1$, $R_2$ and $R_3$ radicals is in the range of from 18 to 38.

Thus, there are provided according to this invention halogen-containing resin compositions comprising halogen-containing resins having incorporated therein one or more of the above esters.

The fatty acids expressed by the above general formula can be prepared by reacting olefins containing 20 to 40 carbon atoms with carbon monoxide and water under the application of pressure and heat in the presence of a catalyst comprising a compound of a metal of group VIII of the periodic table. These fatty acids can also be prepared by reacting olefins containing 20 to 40 carbon atoms with lower fatty acids in the presence of a catalyst comprising the cobalt or manganese salts of fatty acids. This latter reaction can take place in the copresence of peroxides.

In preparing the fatty acids expressed by the above general formula, the number of carbon atoms contained in each of the $R_1$, $R_2$ and $R_3$ radicals can be adjusted by selecting different olefin and/or lower fatty acid starting materials or by modifying the reaction conditions.

In the above general formula, if the total number of carbon atoms contained in the $R_1$, $R_2$ and $R_3$ radicals is smaller than 18, the resulting esters will be poor in lubricating effect. On the other hand, if it is greater than 38, the resulting esters will undesirably show an ill balance between internal and external lubricities.

The polyhydric alcohols containing from 2 to 6 carbon atoms include ethylene glycol, propylene glycol, 1,3-butanediol, 1,4-butanediol, glycerol, trimethylolethane, pentaerythritol, and analogous compounds.

The esterification reaction of one or more fatty acids expressed by the above general formula with one or more polyhydric alcohols containing from 2 to 6 carbon atoms can be carried out using conventional techniques.

Also, the above esters which are used as lubricants according to this invention may be prepared, without using any fatty acid expressed by the above general formula, by reacting olefins containing 20 to 40 carbon atoms and carbon monoxide directly with one or more polyhydric alcohols containing from 2 to 6 carbon atoms under the application of pressure and heat in the presence of a catalyst comprising a compound of a metal of group VIII of the periodic table.

The present esters thus prepared may be added to a halogen-containing resin in the same manner as for the prior art lubricants. This is, they may be first combined and mixed with other additives such as stabilizer, pigment, and the like, and then added to the halogen-containing resin. Alternatively, they may be added, separately from other additives, to the halogen-containing resin in any suitable order. The present esters may be added to a halogen-containing resin in substantially the same amount as for the prior art lubricants. Preferably, they are added in an amount equal to from 0.1 to 3 parts by weight per 100 parts by weight of the halogen-containing resin.

The halogen-containing resins which may be employed in the practice of this invention include polyvinyl chloride, polyvinylidene chloride, chlorinated polyethylene, chlorinated polypropylene, copolymers of vinyl chloride and vinylidene chloride, copolymers of vinyl chloride and other vinyl monomers, copolymers of vinylidene chloride and other vinyl monomers, copolymers of vinyl chloride, vinylidene chloride and other vinyl monomers, and mixtures of any two or more of the foregoing polymeric materials.

The halogen-containing resin compositions of this invention, which comprise halogen-containing resins having incorporated therein one or more of the above esters, are excellent in lubricity and heat stability, can be easily milled and molded because of no occurrence of "plate-out," and show only a low degree of discoloration.

The molded products made of these halogen-containing resin compositions have high transparency and good impact resistance, cause no occurrence of "blooming," and do no damage to printability, thereby finding applications in a variety of industrial fields.

In addition, the present compositions are excellent in both internal and external lubricities as well as in the balance between these lubricities. Therefore, as contrasted with the prior art halogen-containing resin compounds which must be pelletized prior to molding, the present compositions in a powdery form can be molded directly, thereby effecting considerable economies through elimination of the pelletizing step.

Now, preparation of the esters of this invention is illustrated in the following Procedures 1–4. Thereafter, Examples 1–10 in which the esters thus prepared were added to halogen-containing resin compounds will be given as compared with Controls 1–15.

Procedure 1

In a 2-liter autoclave made of stainless steel, 0.1 mole of the cobalt salt of a mixture of fatty acids containing from 21 to 31 carbon atoms and 0.7 mole of γ-picoline were placed, and allowed to react for 1 hour with stirring at 170° C under the pressure consisting of a carbon monoxide pressure of 100 kg/cm$^2$ and a hydrogen pressure of 100 kg/cm$^2$.

After cooling, the gas in the autoclave was discharged. Then, 2 moles of a mixture of olefin containing from 20 to 30 carbon atoms and 1 mole of 1,3-butanediol were added, and allowed to react for 2.5 hours with stirring at 170° C under a carbon monoxide pressure of 200 kg/cm$^2$. After cooling, the gas was discharged, the reaction mixture was withdrawn, and low-boiling materials were distilled off. Thereafter, the residue was distilled on a centrifugal molecular still to yield the 1,3-butanediol ester (Ester No. 1) of a mixture of fatty acids (linear/branched molecule ratio = 75/25) containing from 21 to 31 carbon atoms.

Procedure 2

In a 2-liter autoclave made of stainless steel, 0.1 mole of cobalt oxide and 0.7 mole of γ-picoline were placed, and allowed to react for 1 hour with stirring at 160° C under the pressure consisting of a carbon monoxide pressure of 75 kg/cm$^2$ and a hydrogen pressure of 75 kg/cm$^2$.

After cooling, the gas was discharged. Then, 2 moles of a mixture of even-numbered olefins containing from 24 to 32 carbon atoms and 4 moles of methanol were added, and allowed to react for 8 hours with stirring at 160° C under a carbon monoxide pressure of 150 kg/cm$^2$.

After cooling, the gas in the autoclave was discharged, the methanol and γ-picoline were distilled off, and the residue was then distilled on a centrifugal molecular still to yield the methyl ester of a mixture of odd-numbered fatty acids containing from 25 to 33 carbon atoms.

Next, 1.4 moles of the above methyl ester, 0.6 mole of ethylene glycol, and 10 grams of p-toluenesulfonic acid were placed in a 2-liter round bottom flask, and allowed to react for 8 hours at 100° C while distilling off the methanol formed. After washing the reaction mixture with water to remove the p-toluenesulfonic acid, the remaining water was distilled off, and the residue was then distilled on a centrifugal molecular still to yield the ethylene glycol ester (Ester No. 2) of a mixture of odd-numbered fatty acids (linear/branched molecule ratio = 50/50) containing from 25 to 33 carbon atoms.

Procedure 3

In a 2-liter autoclave made of stainless steel, 0.1 mole of cobalt oxide and 0.7 mole of γ-picoline were placed, and allowed to react for 1 hour with stirring at 170° C under the pressure consisting of a carbon monoxide pressure of 100 kg/cm$^2$ and a hydrogen pressure of 100 kg/cm$^2$.

After cooling, the gas in the autoclave was discharged. Then, 1.5 moles of a mixture of even-numbered olefins containing from 30 to 34 carbon atoms and 3 moles of water were added, and allowed to react for 10 hours with stirring at 170° C under a carbon monoxide pressure of 200 kg/cm$^2$. After cooling, the gas was discharged, the water and γ-picoline was distilled off, and the residue was then distilled on a centrifugal molecular still to yield a mixture of odd-numbered fatty acids containing from 31 to 35 carbon atoms.

This fatty acid mixture was heated to dissolve in octane, allowed to recrystallize, and then filtered. When the octane was distilled off, the mother liquor gave a mixture of odd-numbered fatty acids containing from 31 to 35 carbon atoms and consisting mainly of branched molecules.

Next, 1 mole of the above fatty acid mixture and 0.45 mole of 1,4-butanediol were placed in a 2-liter round bottom flask, and allowed to react for 10 hours at 180° C and reduced pressure.

After distilling off low-boiling materials, the residue was distilled on a centrifugal still to remove unreacted fatty acids, thereby leaving the 1,4-butanediol ester (Ester No. 3) of a mixture of odd-numbered and branched fatty acids containing from 31 to 35 carbon atoms.

Procedure 4

In a 2-liter autoclave made of stainless steel, 0.1 mole of cobalt oxide and 0.7 mole of γ-picoline were placed, and allowed to react for 1 hour with stirring at 170° C under the pressure consisting of a carbon monoxide pressure of 75 kg/cm$^2$ and a hydrogen pressure of 75 kg/cm$^2$.

After cooling, the gas was discharged. Then, 2 moles of a mixture of α- and internally unsaturated olefins containing 20 carbon atoms and 0.5 mole of glycerol were added, and allowed to react for 10 hours with stirring at 160° C under a carbon monoxide pressure of 150 kg/cm$^2$.

After cooling, the gas was discharged, low-boiling materials were distilled off, and the residue was then distilled on a centrifugal molecular still to yield the glyceride (Ester No. 4) of a mixture of fatty acids containing 21 carbon atoms.

EXAMPLES 1-4 AND CONTROLS 1-2

Several compositions were prepared according to the following formulation, and then milled at 180° C on a test roll mill to measure the time required for the polyvinyl chloride resin to start decomposition.

| | |
|---|---|
| Polyvinyl chloride (mean degree of polymerization p = 800) | 100 parts |
| Ca—Zn type metallic soap | 1 part |
| Organotin laurate-malate | 0.5 part |
| Ester of this invention or commercially available lubricant | 1 part |

Note: All parts are by weight in these and succeeding examples.

The results of measurement are given in Table 1.

Table 1

| Sample | Ester of this invention or commercially availale lubricant | Time required to start decomposition (minutes) |
|---|---|---|
| Ex. 1 | 1,3-Butanediol ester (Ester No. 1) | 10 or more |
| Ex. 2 | Ethylene glycol ester (Ester No. 2) | 10 or more |
| Ex. 3 | 1,4-Butanediol ester (Ester No. 3) | 10 or more |
| Ex. 4 | Glyceride (Ester No. 4) | 10 or more |
| Control 1 | Hoechst Wax E (Trade name of a lubricant sold by the Hoechst Company) | 6 |
| Control 2 | Hoechst Wax OP (Trade name of a lubricant sold by the Hoechst Company) | 9 |

As can be seen from Table 1, the compositions of Examples 1-4 containing each of the esters of this invention were much more excellent in heat stability as compared with the compositions of Controls 1-2 containing a modified montan wax such as Hoechst Wax E or OP.

When the vinyl chloride resin compositions of Examples 1-4 were rolled into sheets, the resulting sheets did not show a tendency to wind about the rolls and stick to them, thus indicating that the compositions of this invention were excellent in external lubricity. It was also confirmed that they were similarly excellent in internal lubricity.

Among the compositions given in Table 1, the degree of discoloration during heating increased in the following order: Example 3 ≈ Example 2 < Example 1 ≈ Example 4 << Control 2 < Control 1. This clearly indicates that the compositions of this invention (Examples 1-4) shows a lower degree of discoloration than the prior art compositions (Controls 1-2).

EXAMPLE 5 and CONTROLS 3-5

Several polyvinyl chloride compositions were prepared according to the following formulation, and then milled at 200° C on a test roll mill to measure the time required for each composition to start thermal decomposition.

| | |
|---|---|
| Polyvinyl chloride (mean degree of polymerization p = 800) | 100 parts |
| Ca—Zn type metallic soap | 0.5 part |
| Epoxidized soybean oil | 3 parts |
| Pentaerythritol | 0.3 part |
| Tris (nonylphenyl)phosphite (Stabilizer) | 0.5 part |
| Ester of this invention or commercially available lubricant | 1.5 parts |

The results of measurement of the time required for each composition to start thermal decomposition are given in Table 2.

Table 2

| Sample | Ester of this invention or commercially available lubricant | Time required to start thermal decomposition (minutes) |
|---|---|---|
| Ex. 5 | Ethylene glycol ester (Ester No. 2) | 10 or more |
| Control 3 | Hoechst Wax E | 8 |
| Control 4 | Hoechst Wax OP | 9 |
| Control 5 | Rice Wax M-100 | 7 |

As is evident from Table 2, the composition of this invention containing the ethylene glycol ester was more excellent in heat stability as compared with the prior art compositions containing a modified montan wax or rice wax.

Furthermore the degree of discoloration during heating increased in the following order: Example 5 < Control 3 << Control 5 < Control 4.

EXAMPLE 6 AND CONTROLS 6-8

Several compositions were prepared according to the following formulation, and then rolled into sheets at 170° C on a calender roll. Thereafter, each sheet was pressed at 180° C for 10 minutes to fabricate a specimen.

| | |
|---|---|
| Polyvinyl chloride (mean degree of polymerization p = 800) | 100 parts |
| Tin salt of carboxylic acid (stabilizer) | 3.5 parts |
| Methyl acrylate-butadiene-styrene copolymer | 7 parts |
| Ester of this invention or commercially available lubricant | 1.5 parts |

The transparency and impact resistance of each specimen were tested using a V-notched Izod impact tester. The measurements of the Izod impact strength (kg.cm/cm$^2$) are given in Table 3.

Table 3

| Sample | Ester of this invention or commercially available lubricant | Izod impact strength (kg·cm/cm²) Amount of lubricant added | |
|---|---|---|---|
| | | 1 part | 1.5 parts |
| Ex. 6 | Ethylene glycol ester (Ester No. 2) | 14 | 41 |
| Control 6 | Hoechst Wax OP | 8 | 31 |
| Control 7 | Hoechst Wax E | 6 | 19 |
| Control 8 | Rice Wax M-100 | 4 | 8 |

As is evident from Table 3, the specimen fabricated of the halogen-containing resin composition of Example 6 containing the ethylene glycol ester of this invention was highly excellent in Izod impact strength.

The transparency decreased in the following order: Example 6 ≈ Control 7 > Control 8 > Control 6. This also indicates the superiority of the specimen of this invention.

EXAMPLE 7

A composition was prepared according to the following formulation, and then milled at 190° C for 10 minutes on a test roll mill.

| | | |
|---|---|---|
| Polyvinyl chloride (mean degree of polymerization p = 800) | 100 | parts |
| Chlorinated polyethylene | 5 | parts |
| Tribasic lead sulfate | 3 | parts |
| Lead stearate | 1 | part |
| Barium stearate | 0.3 | part |
| Dibasic lead stearate | 0.2 | part |
| Epoxidized soybean oil | 2 | parts |
| Ethylene glycol ester (Ester No. 2) | 0.3 | part |

This composition gave no decomposition product, thus indicating that it was excellent in internal lubricity.

In addition, the rolled sheet did not show a tendency to wind about the rolls and stick to them, thus indicating that this composition was also excellent in external lubricity. Furthermore, the sheet showed no discoloration.

EXAMPLE 8 AND CONTROLS 9-15

The ingredients of the following formulation were pulverized and dry-blended. This dry blend was placed in a flow tester having an orifice diameter of 2.10 mm and a clinder diameter of 9.55 mm, and tested for flow rate at a temperature of 190° C and an external pressure of 5 kg/cm².

| | | |
|---|---|---|
| Polyvinyl chloride (mean degree of polymerization p = 800) | 100 | parts |
| Organotin mercaptide | 1 | part |
| Calcium stearate | 0.5 | part |
| Ester of this invention or commercially available lubricant | 0.9 | part |

The results of measurement with the flow tester are given in Table 4.

Table 4

| Sample | Ester of this invention or commercially available lubricant | Flow rate (grams/10 minutes) |
|---|---|---|
| Ex. 8 | Ethylene glycol ester (Ester No. 2) | 0.70 |
| Control 9 | Hoechst Wax OP | 0.11 |
| Control 10 | Hoechst Wax E | 0.09 |
| Control 11 | Hoechst Wax GL-3 | 0.12 |
| Control 12 | Rice Wax M-100 | 0.13 |
| Control 13 | Paraffin Wax (m.p. = 155° F) | 0.05 |
| Control 14 | Ethylenedistearylamide | 0.12 |
| Control 15 | Monoglyceride of stearic acid | 0.26 |

As is evident from Table 4, the halogen-containing resin composition of Example 8 containing the ester of this invention was very excellent in lubricity.

EXAMPLE 9

Two compositions were prepared according to the following Formulations A and B. First, the composition of Formulation A was milled at 170° C for 10 minutes on a test roll mill, and the resulting sheet was removed. Thereafter, without cleaning the roll surfaces, the composition of Formulation B was milled at 170° C for 5 minutes on the same test roll mill.

| Formulation A | | |
|---|---|---|
| Polyvinyl chloride (mean degree of polymerization p = 1000) | 100 | parts |
| Dioctyl phthalate (commercially available plasticizer) | 48 | parts |
| Epoxidized soybean oil | 2 | parts |
| Commercially available CD—Ba type stabilizer | 1.5 | parts |
| Watchung Red (red pigment) | 1.0 | part |
| 1,3-Butanediol ester (Ester No. 1) | 0.5 | part |
| Formulation B | | |
| Polyvinyl chloride (mean degree of polymerization p = 1000) | 100 | parts |
| Dioctyl phthalate | 40 | parts |
| Calcium carbonate | 10 | parts |
| Titanium oxide | 1 | part |
| Ca—Ba type complex metallic soap | 1 | part |

Although the composition of Formulation B was milled immediately after the composition of Formulation A, the sheet of Formulation B took no red color, thus indicating that the composition of Formulation A within the scope of this invention did not cause the occurrence of "plate-out."

EXAMPLE 10

A composition was prepared according to the following formulation, and then milled at 170° C for 10 minutes on a test roll mill.

| | | |
|---|---|---|
| Polyvinyl chloride (mean degree of polymerization p = 1000) | 100 | parts |
| Dioctyl phthalate | 48 | parts |
| Epoxidized soybean oil | 2 | parts |
| Ca—Ba type fluid stabilizer | 1.5 | parts |
| Carbon black | 0.3 | part |
| 1,4-Butanediol ester (Ester No. 3) | 0.5 | part |

After milling, the resulting sheet was removed and immersed for 12 hours in a water bath heated to 70° C. Then, a sample of the sheet was taken and air-dried at room temperature for 24 hours. Observation of the surface conditions revealed that none of the ingredients had exuded to the sheet surfaces, thus indicating the excellence of this composition which caused no occurrence of "blooming."

What we claim is:

1. A halogen-containing resin composition comprising a halogen-containing resin having incorporated therein one or more esters which lubricate and heat stablize said resin, said esters being derived from one or more fatty acids and one or more polyhydric alcohols selected from the group consisting of ethylene glycol, propylene glycol, 1,3-butanediol, 1,4-butanediol, glycerol, trimethylolethane, and pentaerythritol, said fatty acids being expressed by the general formula

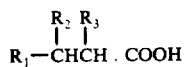

where at least two of the $R_1$, $R_2$ and $R_3$ radicals are alkyl radicals and, when two of them are alkyl radicals, the remaining one is hydrogen; and the total number of carbon atoms contained in the $R_1$, $R_2$ and $R_3$ radicals is in the range of from 18 to 38.

2. A composition of claim 1 wherein said halogen-containing resin is a chlorine-containing resin selected from the group consisting of polyvinyl chloride, polyvinylidene chloride, chlorinated polyethylene, chlorinated polypropylene, copolymers of vinyl chloride and vinylidene chloride, copolymers of vinyl chloride and other vinyl monomers, copolymers of vinyliden chloride and other vinyl monomers, copolymers of vinyl chloride, vinylidene chloride and other vinyl monomers, and mixtures of any two or more of the foregoing polymeric materials.

3. A composition of claim 1 wherein said esters are present in an amount equal to from 0.1 to 3 parts by weight per 100 parts by weight of said halogen-containing resin.

4. A composition of claim 1 wherein the polyhydric alcohol is ethylene glycol.

5. A composition of claim 1 wherein said polyhydric alcohol is pentaerythritol.

6. A composition of claim 1 wherein said fatty acid is a fatty acid having an odd number of carbon atoms.

* * * * *